United States Patent [19]
Senicourt et al.

[11] 4,423,635
[45] Jan. 3, 1984

[54] SYSTEM OF ANALYSIS BY VISUAL DISPLAY OF THE VIBRATORY MOVEMENTS OF A ROTARY MACHINE

[75] Inventors: Jacques-Marie Senicourt, Villemonble; Jean-Louis Tebec, Gif sur Yvette, both of France

[73] Assignee: Societe Nationale elf Aquataine, France

[21] Appl. No.: 379,984

[22] Filed: May 19, 1982

[30] Foreign Application Priority Data

May 21, 1981 [FR] France .................. 81 10135

[51] Int. Cl.³ .................. G01H 1/00; G01M 13/00
[52] U.S. Cl. .................. 73/593; 73/660; 340/682
[58] Field of Search .................. 73/660, 593; 340/682, 340/683

[56] References Cited
FOREIGN PATENT DOCUMENTS 2266148 10/1975 France .

*Primary Examiner*—Howard A. Birmiel
*Attorney, Agent, or Firm*—Kerkam, Stowell, Kondracki & Clarke

[57] ABSTRACT

The invention relates to a system of analysis by visual display of the vibratory movements of a rotary machine having at least one shaft supported by at least one bearing.

This system comprises two first transducers transmitting electrical signals as a function of the relative displacements of the shaft with respect to the bearing, positioned in the bearing and forming between the two transducers an angle of 90°, two second transducers transmitting electrical signals as a function of the absolute displacements of the bearing and positioned level with the bearing forming between the two transducers an angle of 90°, control and detection means connected to the first and second transducers, means for combining the electrical signals from the detection means making it possible to determine the absolute movement of the shaft, display means for producing and positioning two groups of animated or moving circles so as to display the real image of the machine.

22 Claims, 9 Drawing Figures

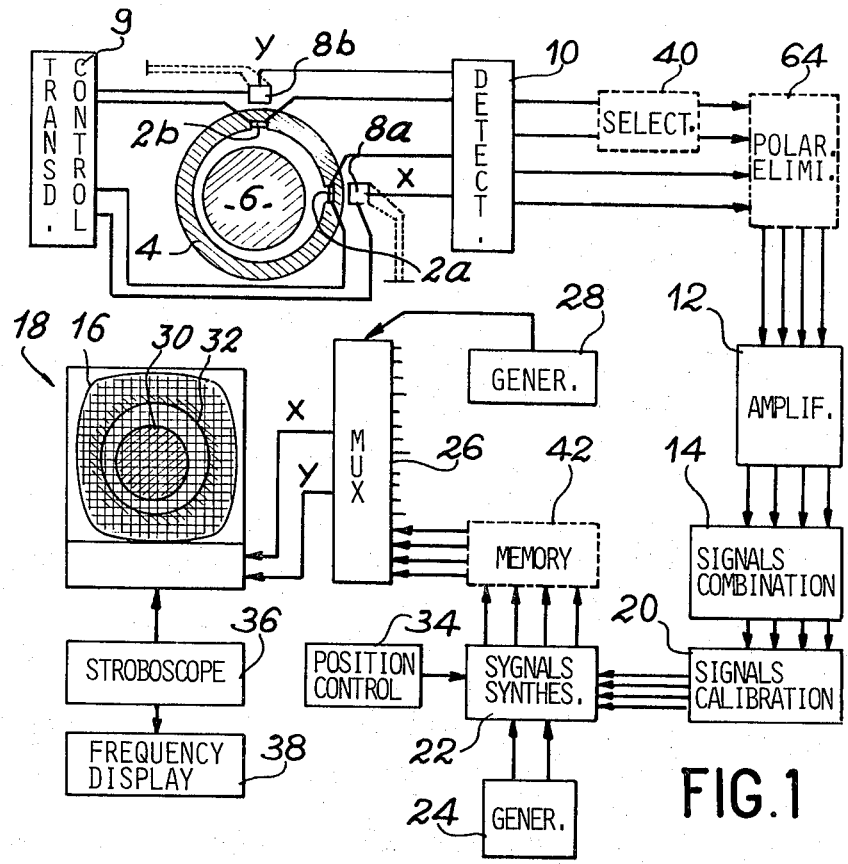
FIG.1
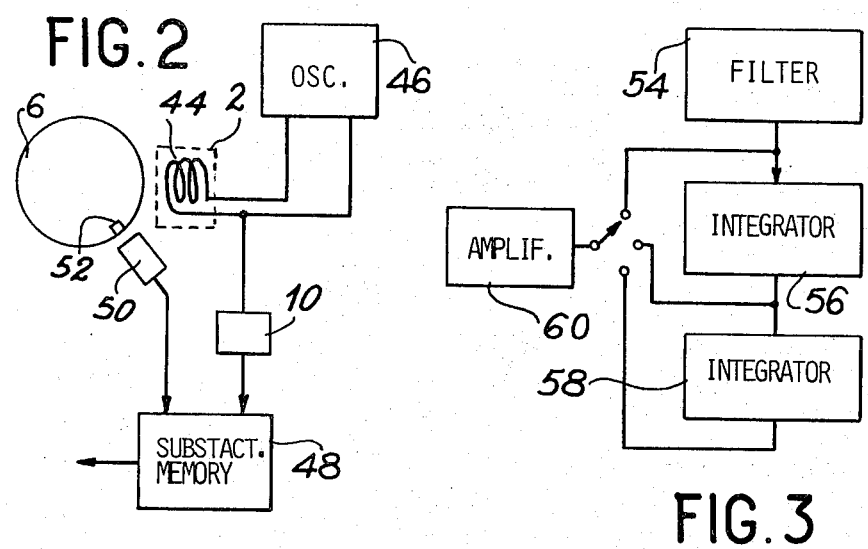
FIG.2
FIG.3

SYSTEM OF ANALYSIS BY VISUAL DISPLAY OF THE VIBRATORY MOVEMENTS OF A ROTARY MACHINE

BACKGROUND OF THE INVENTION

The present invention relates to a system of analysis by display of the vibratory movements of a rotary machine. This analysis system in particular makes it possible to carry out predictive maintenance of rotary machines, particularly large machines which can have a plurality of shafts supported by fluid bearings such as oil bearings, hydrostatic bearings, air bearing, etc.

The maintenance of rotary machines has developed rapidly over the past few years. However, in the case of large machines having fluid bearings, these developments have been held up by a number of difficulties. Due to their strategic importance in industrial installations, these machines must be able to operate for a long time without stopping.

In the case of a breakdown, or even merely an inspection, the cost of stopping the machines is considerable. Thus, preventative maintenance must give way to predictive maintenance, which makes it possible to act at the opportune moment. This type of maintenance necessarily presupposes a precise diagnosis of the state of the machine and necessarily implies the understanding of the signals which are symptomatic of its operation.

Studies have shown that most analysis means used up to now are relatively unsuitable for this type of investigation of large machines, which are the very type requiring such monitoring most. Far too often, monitoring is reduced to "alarm bells", which cause difficulties without providing the means necessary to make a decision to stop the machine, or to continue operation of the machine therewith.

The hitherto known monitoring procedures can be grouped in the following three categories:
 comparison with predetermined vibratory levels,
 spectral frequency analysis,
 the study of Lissajous' curves or the orbital method.

The limitations of these monitoring categories will briefly be described in the case of fluid bearing machines.

In the case of the first category, the signals collected are dependent on the characteristics of the machine, its installation, couplings and foundations, as well as the precise location at which these signals are intercepted (vibration node or antinode, bearing or frame, etc). Therefore, the thresholds recommended by standards can only serve for information purposes.

On reaching a threshold, should the machine be stopped? The most sophisticated equipment indicating the tendency of the development of wear in a machine or which calculate the date when this level will be reached are based on the same principle and still fail to answer this question. The information intercepted at the outset is inadequate for explaining the behaviour of the machine. The missing information cannot be provided by any electronics or informatics processing.

When numerous identical machines are monitored by this process, it is possible to empirically or statistically fix the level of the alarm. However, this method cannot be used when there is only a single large machine.

In the case of the second category, the presence of fluid films and particularly oil films in connection with thebearings, which introduce into the mechanical assembly extremely non-linear connections from the vibratory standpoint (the rigidity of an oil film not being constant), for example, makes it almost impossible to determine the movements of the machine rotor on the basis of the analysis of a signal connected on its frame by means of an accelerometer. Examination of the spectrum essentially provides information on the vibratory responses of the structures and the environment of the machine, but little information is given on the cause of the vibrations. It is still very difficult and requires specialists to interpret the results. Therefore, this monitoring procedure does not lend itself well to monitoring in industry.

The third category consists of studying the movements of the shaft of the machine in the associated bearings by means of two transducers, e.g. of the eddy current type positioned at 90° from one another and at a certain distance from the shaft. The signals from these transducers are proportional to the distance and are transmitted to an oscilloscope with two inputs X and Y, so as to form a Lissajous curve corresponding to the movement of the shaft in the bearings.

However, in the case of this monitoring procedure, the measurement is of a relative nature and no information is provided on the position and size of the trajectory or path relative to the clearance between the shaft and the bearing. Thus, this trajectory does not represent the movement of the centre of the shaft, because the bearing has its own movement. Except in a few simple cases, this display procedure rapidly leads to the formation of complex images, which cannot be processed or used.

BRIEF SUMMARY OF THE INVENTION

The invention therefore relates to a system of analysis by visual display of the vibratory movements of a rotary machine making it possible to obviate hereinbefore disadvantages.

In particular, it makes the present invention possible to determine the absolute movements of the shaft of a machine in its bearings, as well as the movements of the actual bearings. Moreover, the interpretations of the signals obtained according to the invention can be easily carried out by mechanics persons responsible for the maintenance of the machines.

More specifically, the present invention relates to a system of analysis by visual display of the vibratory movements of a rotary machine comprising at least one shaft supported by at least one bearing, wherein the system comprises for each bearing and that part of the shaft supported by the bearing, two first transducers able in each case to transmit electrical signals as a function of the relative displacements of the shaft relative to the bearing, said first two transducers being located in the bearing facing the shaft in such a way that they form a given angle between them; two second transducers each able to transmit electrical signals which are a function of the absolute displacements of the bearing. The two second transducers being positioned level with the bearing so that they form a given angle between the transducers; control means and detection means connected to the two first and two second transducers; means for combining the electrical signals from the detection means making it possible to determine the absolute movements of the shaft; display means; means for simultaneously producing on the display means two groups of animated or moving circles, the movements of the circles of the first group representing the displacements of the shafts in the bearings and the movements of the circles of the second group representing the displacements of the bearings; and means making it possible to position the two groups of moving circles on the display means so as to represent function of the true image of the machine.

According to a preferred embodiment of the invention, one of the two first transducers is aligned with one of the two second transducers and the other first transducer is aligned with the other second transducer.

Preferably, the two first transducers are displacement transducers and the two second transducers are either accelerometers, or velocity microphones, or displacement transducers.

According to a preferred embodiment of the invention, the system also comprises means making it possible to eliminate unwanted electrical signals or run-out from the two first transducers, which are not a function of the displacements of the shaft.

According to another preferred embodiment of the invention, the display means also comprise means making it possible to slow down the movement of the two displayed circles. In this type of display, the angle formed between by the two first transducers between them and between the two second transducers is preferably 90°.

Accordingly, in another preferred embodiment of the invention, the means for producing the two moving circles are constituted by a generator generating two groups of sinusoidal electric signals phase-displaced by an angle of $\pi/2$ and means for synthesizing electrical signals as a function of the displacements of the shafts and the bearings and the sinusoidal signals.

According to the invention, the display means comprise, for example, a display unit with two inputs X and Y provided with a screen and a Wehnelt control and a multiplexing system with four inputs per bearing and two outputs corresponding to the inputs X and Y of the display unit.

According to a preferred embodiment of the invention, the system permitting the analysis of the vibratory movements of several rotary machines each having at least one shaft supported by at least one bearing, also comprises means permitting the storage of the respective positions of the moving circles corresponding to each of said machines.

The system according to the invention makes it possible to determine the movements of the shaft and the bearing of a machine in both a qualitative and quantitative manner. Consequently, the system according to the invention can be provided with means making it possible to directly measure, e.g. on the screen of the display unit, the displacement values of shafts and bearings, as well as the phase displacement of the different movements observed.

BRIEF DESCRIPTION OF THE DRAWINGS

The invention is described in greater detail hereinafter relative to non-limitative embodiments and the attached drawings, wherein:

FIG. 1 a block diagram of the analysis system according to the invention.

FIG. 2 a block diagram of the first eddy current-type transducers and the associated electronics.

FIG. 3 a block diagram of the electronics associated with the second transducers of the velocity microphone or accelerometer type.

DETAILED DESCRIPTION OF THE PREFERRED EMBODIMENTS

Figure 4A:
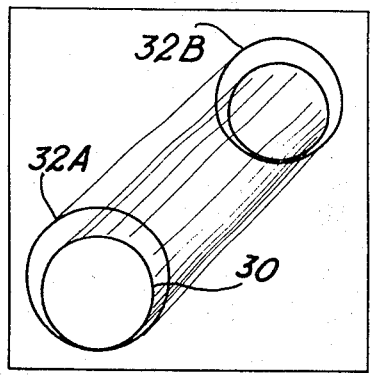
FIGS. 4A–F illustrate different results obtained with the system according to the invention on a machine having a shaft supported by two bearings, with FIG. 4a showing the machine when stopped, FIG. 4b showing the machine rotating correctly, FIGS. 4c and 4d showing the machine with a static unbalancing mass, FIG. 4e showing the machine with a dynamic unbalancing mass and FIG. 4f showing the machine exposed to a fixed stress or load.

FIG. 1 shows a block diagram of the analysis system according to the invention. In order to facilitate the description thereof, a rotary machine is shown, which has a shaft supported by a single bearing, but as has been stated hereinbefore, the invention applies in general terms to machines having one or more shafts arranged in all possible manners relative to one another and supported by one or more bearings.

In the case of a shaft supported by a single bearing, the analysis system according to the invention comprises two first transducers 2a, 2b generally identical and fixed into bearing 4 of the rotary machine and facing shaft 6 supported by bearing 4, whilst there are two second transducers 8a and 8b, which are also generally identical and positioned level with bearing 4, together with analysis electronics associated with said first and second transducers.

When the machine rotates, the transducers transmit electrical signals corresponding to the vibrations of the machine. The two first transducers 2a, 2b transmit electrical signals corresponding to the relative displacements of shaft 6 and bearing 4, whilst the two second transducers 8a, 8b transmit electrical signals corresponding to the absolute displacements of bearing 4. The absolute displacements of bearing 4 are determined relative to a reference system, which is, for example, the room or laboratory in which the rotary machine is installed. In this case, the second transducers can be fixed to the floor of the room or laboratory serving as a Galilean reference system.

The first transducers 2a, 2b form between them an angle of 90°, as do the second transducers 8a, 8b. Moreover, the first transducer 2a and the second transducer 8a can be aligned, as can the first transducer 2b and the second transducer 8b. Transducers 2a and 8a are, for example, positioned in accordance with an axis designated X and transducers 2b and 8b in accordance with an axis designated Y.

Each of the said first and second transducers are associated with control electronics 9 and detection electronics 10, which are dependent on the transducer type used. The electronics and the different transducer types will be described hereinafter.

The electrical signals from the detection electronics 10 can be amplified by means of an amplifier 12. These signals are then combined in pairs by means of an electronics circuit 14, so as to determine electrical signals corresponding to the absolute movements of shaft 6, i.e. the movements of the shaft with respect to the reference system. This combination is obtained by adding or subtracting the electrical signal supplied by the detection electronics 10 corresponding to the first transducer 2a to or from the electrical signal supplied by the detection electronics 10 corresponding to the second transducer 8a, as well as by adding and subtracting the electrical signal supplied by the detection electronics 10 corresponding to the first transducer 2b to or from the electrical signal supplied by the detection electronics 10 corresponding to the second transducer 8b. The four electrical signals from the combination means 14 then correspond to the absolute displacements of shaft 6 and bearing 4 in accordance with axes X and Y.

With a view to displaying the four combined signals, on a screen 16 of a display unit 18 such as an oscilloscope of the cathode ray type, the amplitude of these signals can be regulated and calibrated by means of a calibration circuit 20. These signals can then be transmitted into an electronics circuit 22 connected to display unit 18.

Moreover, a generator 24 is provided for generating two sinusoidal electrical signals phasedisplaced by an angle of $\pi/2$. These sinusoidal or sine-wave signals are injected into electronic circuit 22 so as to synthesize them with the four signals, whose amplitude has been previously regulated and calibrated in circuit 20.

The four electrical signals from circuit 22 are then transmitted to a multiplexing system comprising a multiplexer 26 with four inputs and two outputs directly connected to input X and input Y of the display unit 18 formed by an oscilloscope, said multiplexer 26 being controlled by a generator 28. The two signals from circuit 22 and corresponding to the movements of shaft 6 in its bearing 4 are selected by multiplexer 26, then transmitted to inputs X and Y of display unit 18 so as to obtain a circle 30 on screen 16 of the display unit. The two signals from circuit 22 and corresponding to the movements of bearing 4 are then selected by multiplexer 26 and transmitted to inputs X and Y of display unit 18 in such a way as to obtain a circle 32 on screen 16 of the display unit.

These circles 30 and 32 represent shaft 6 in its bearing 4, which in fact corresponds to a section of the machine along a plane perpendicular to its longitudinal axis level with the bearing.

Circles 30 and 32 are animated, i.e. the circles move on the screen. They make it possible to display the displacements of the shaft and the bearing, said displacements corresponding to the vibratory movements of the machine. This makes it possible to restore the mechanical deformations of the machine, if they exist, and facilitate the interpretation of the vibratory phenomena thereof by mechanics who are generally little accustomed to electronic signal processing methods.

Moreover, the analysis system according to the invention makes it possible to restore the absolute and relative movements of the shaft and the absolute movements of the bearing, and not only the relative movements as in the prior art systems.

The hitherto described system related to a machine comprising a single shaft supported by a single bearing. In the case of a machine with several shafts and several bearings, which is generally the case with large machines, there is an electronics circuit 34 connected to the electronic circuit 22. Circuit 34 makes it possible to position the different circles 30, 32 relative to one another and respectively corresponding to the different shafts and different bearings of the machine, so as to reproduce the complete machine on the display unit screen, i.e. the true positioning of the different shafts and the different bearings. The morphology of the machine is obviously stored beforehand in circuit 34.

In the case of a machine with several shafts and several bearings, the number of inputs of multiplexer 26, obviously differs from 4. For example, in the case of a shaft supported by two bearings, the multiplexer will have eight inputs, in the case of two shafts each supported by two bearings the multiplexer will have 16 inputs, etc. It should be noted that the control frequency of the multiplexer can be modified. Therefore, the number of transducers used is a function of the number of shafts and bearings of the machine.

The animated or moving circles are displayed in real time and simultaneously for several bearings and the corresponding parts of the shafts.

Furthermore, according to the invention, the analysis system can be provided with means 35 connected to the display unit 18 making it possible to electronically slow down the displayed images in order to obtain a more precise and easier interpretation of the vibratory phenomena and, in particular, the phase displacements between these different movements.

In the case of a display unit 18 incorporating a Wehnelt control or an input Z (not shown), which is generally the case, these means are constituted by a regulatable frequency stroboscope connected to the said control.

The Wehnelt control is then subject to the action of pulses, whose frequency is close to that of the vibratory phenomena being studied. An immobilization of the circles makes it possible to indicate the vibration frequency of the machine. In addition, stroboscope 36 can be connected to a device 38 making it possible to display the animation frequency of the circles, i.e. the frequency of the movements observed.

The system according to the invention is designed so as to make directly accessible the measurement of shaft and bearing displacements, as well as the frequencies and phase displacements of the movements observed. These measurements can be made e.g. by using a squared oscilloscope screen. However, it is obvious that other measurement means can be considered.

Up to now, a description has been given of a system permitting a display of the phenomena on a display unit such as an oscilloscope with two inputs X and Y, but it is obvious that a display system with several inputs X and Y can be envisaged. In this case, the multiplexing system can be eliminated. The other display means can be constituted by a video screen (television). Moreover, the animated or moving circles can be recorded and need only be displayed on an optional basis.

According to the invention, the analysis system can be provided with an electronic circuit 40 making it possible, if desired, to select either absolute movements of the shaft and bearing, or relative movements of the shaft relative to the bearing by stopping the animated circle 32 corresponding to the movement of the bearing on the oscilloscope screen. For example, this makes it possible to see in what way the shaft is displaced in its bearing.

In the case where several machines are installed at the same place, a single analysis system may suffice. However, in order to obviate all settings and controls, the storage of the morphology of the machine, the positioning and size of the circles on the screen, etc. a memory 42 connected to electronic circuit 22 can be provided in order to store the circles representing the morphology on each machine.

It should be noted that the relative positioning of the different circuits, as shown in FIG. 1, can be modified in a random number of ways. For example, the control circuit 20 and amplifier 12 can be placed at any random point between the detection electronics 10 associated with transducers and oscilloscope 18.

As stated hereinbefore, the first and second transducers can be of different types and the control electronics 9 and detection electronics 10 associated therewith are a function of said type.

The first transducers 2a, 2b, which can be identical, are displacement transducers such as e.g. contact-free eddy current transducers or capacitive or inductive transducers, whilst the second transducers 8a, 8b, which can also be identical, are e.g. displacement transducers of the contact-free eddy current type or of the seismic type (suspended mass transducer), or velocity microphones (electrodynamic transducer), or accelerometers (piezoelectric transducers).

When the second transducers are constituted by contact-free displacement transducers, they are positioned facing the bearings, as shown in FIG. 1, whereas when other transducer types are used, said second transducers are placed on the bearing.

FIG. 2 shows a block diagram of the first transducers, as well as the control and detection electronics associated therewith. These first transducers are of the contact-free eddy current type.

These transducers are generally constituted by a coil 44 controlled by an oscillator 46 generating a frequency of 1 to 2 MHz. The signal supplied by these transducers are then detected by the associated detector 10. Due to the fact that a high frequency is applied to the coil, the eddy currents induced in machine shaft 6 are surface currents. Therefore, any defect of the shaft modifies the signal supplied by these transducers. It is therefore necessary to eliminate all unwanted signals or run-out resulting from said defects. These faults or defects of the shaft are, for example, due to the fact that a shaft is never round, that it has scratches and unevennesses and that the material from which it is produced is rarely homogeneous, etc.

The electrical signals corresponding to the faults and defects of the shaft are recorded beforehand and stored, together with their locations on the shaft. The run-out is then subtracted point by point from the signals corresponding to the calibrations of the shaft. The electronics permitting the subtraction of their run-out and their storage carries the overall reference numeral 48.

The marking of the location of these faults or defects is obtained by means of a supplementary transducer, e.g. an eddy current transducer 50 facing mark 52 integral with the shaft, said mark possibly being a scratch made in the shaft. The transducer is generally located in the bearing, like the first transducers 2a, 2b.

The faults and effects are stored beforehand using a device identical to that shown in FIG. 2, but in this case electronics 48 merely constitutes a memory. The location of these faults is marked by the phase displacement existing between the two transducers 2, 50. This storage is carried out by rotating the shaft at a low speed so as not to produce vibrations.

The system making it possible to mark the shaft defects, as well as subtract the corresponding run-out has been described in a detailed manner in the Davis U.S. Pat. No. 4,134,303 entitled "Method and circuit for providing electrical run-out reduction in rotating shaft vibration detection system".

Obviously, run-out can be eliminated by all the usable types of said first transducers.

Besides the control and detection electronics associated with each of the second transducers 8a, 8b (load amplifier, gauge bridge, etc.), said second transducers are associated with complementary electronics.

FIG. 3 shows a block diagram of the complementary electronics associated with these transducers, when the latter are velocity microphones or accelerometers. The electronics is mainly constituted by a regulatable high pass filter 54 making it possible to eliminate the very low frequencies which are a function of the rotation speed of the machine. Filter 54 is connected to a single integrator 56, when using velocity microphones, and is connected to two electrically interconnected integrators 56, 58 when accelerometers are used.

The electrical signals from the integrator 56 or the two integrators 56, 58 can then be amplified by means of an amplifier 60. This amplification is used for obtaining signals of the same amplitude as those supplied by the first transducers 2a, 2b.

When transducers having a polarization are used, i.e. the signals from the said transducers have a continuous component, the analysis system according to the invention must be provided with an electronic circuit 64 connected to amplifier 12 (FIG. 1) making it possible to eliminate the polarization of the electrical signals from said transducers. Thus, certain transducers, e.g. eddy current transducers supply a negatively polarized signal (continuous negative component), whereas other transducers supply a positively polarized signal (continuous positive component). The combination of the signals transmitted by the transducers into electronic circuit 14 must take place with signals having no polarization, so that they must be eliminated.

For the realisation of the analysis system according to the invention and in order to have a good knowledge of the characteristic signature of the operating faults of a machine, various tests have been carried out by means of a test bench incorporating a shaft supported by two oil bearings. The assembly, driven by a variable speed motor, makes it possible to artificially recreate faults similar to those occurring in practice.

Certain of the results obtained are shown in FIGS. 4a-f. It should be noted that the size of the images on the oscilloscope screen is unrelated to the true dimensions of the machine, whereas the amplitudes of the vibrations (movements of the shaft and bearings), the clearances (thickness of the fluid film) between the circles representing the shaft and the bearings are in accordance with what takes place in the machine. Circle 30 represents the machine shaft, whilst circles 32a, 32b represent the two bearings supporting the shaft.

FIG. 4a shows the machine when stopped. The shaft, under its own weight, resting in the bearings.

Figure 4B:
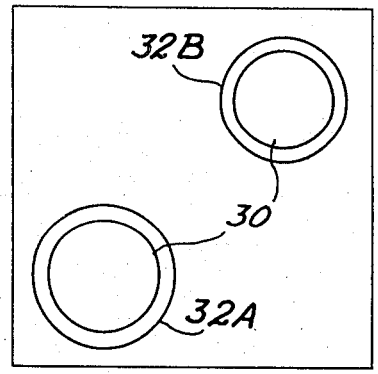

FIG. 4b shows the machine rotating at 200 r.p.m. It can be seen that no defect affects the operation of the machine. The shaft is well balanced and rotates in the centre of the bearings on an oil film of constant thickness. There are no visible vibratory movements of the shaft or bearings.

Figure 4C:
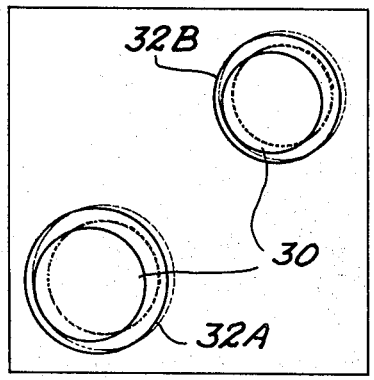
Figure 4D:
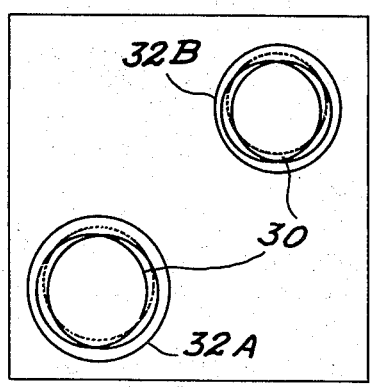

FIGS. 4c and 4d show a static unbalancing mass. FIG. 4c represents the absolute movements of shaft and bearing, whilst FIG. 4d represents the relative movements of the shaft in the bearing. The latter is made possible by movement selector 40 (FIG. 1). When the circles are animated, the shaft moves with the same phase displacement in both bearings. The display of the phase displacements is obtained by the electronic open-circuit 36. The zero phase displacement is determined by the fact that the displacement of the shaft in the two bearings is the same.

Figure 4E:
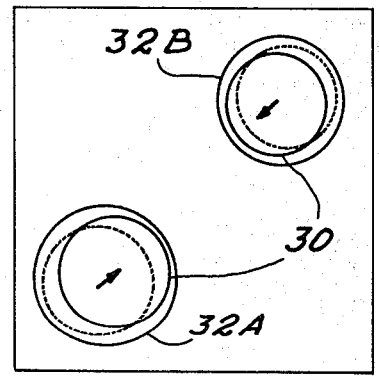

FIG. 4e shows the relative movements of the shaft in its bearings, the shaft then being exposed to a dynamic unbalancing mass. The displacements of the shaft in the two bearings, the phase displacement in the two bearings are opposed. In FIG. 4e the machine rotated at 200 r.p.m.

Figure 4F:
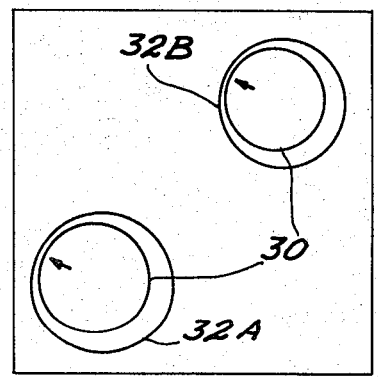

FIG. 4f represents a fixed stress or load leading to an overall displacement of the shaft in the direction of the force, the machine rotating at 200 r.p.m.

Besides these different results, the analysis system makes it possible to demonstrate misalignments of shafts in the case of a machine having several shafts placed end to end, loosening of bearing, external excitations, etc. Moreover, any combination of the different faults referred to hereinbefore can be envisaged and analysed by means of the system according to the invention.

Through displaying vibratory phenomena in the form of displacements, the system according to the invention permits an easy interpretation of the vibratory phenomena to which the machine is exposed.

As stated hereinbefore, this analysis system is particularly applicable to large machines with fluid bearings, because statical methods cannot be used in such machines in view of their small number. Moreover, the existence of a fluid bearing makes it possible to clearly see the displacement of the shaft in the bearings.

However, the system according to the invention is applicable to any machine and even to small machines mounted on rail bearings. Thus, over a period of time, the rails are subject to wear and a certain clearance appears. In this area, with the system of the invention, it is possible to display the displacements of the shaft and the bearing, the deformations of the shaft, the variations of the clearance, etc.

What is claimed is:

1. A system of analysis by visual display of the vibratory movements of a rotary machine comprising at least one shaft supported by at least one bearing, wherein said system comprises for each bearing and that part of the shaft supported by the bearing, two first transducers able in each case to transmit electrical signals as a function of the relative displacements of the shaft relative to the bearing, said two first transducers being located in the bearing facing the shaft in such a way that they form a given angle between the transducers; two second transducers each able to transmit electrical signals which are a function of the absolute displacements of the bearing, said two second transducers being positioned level with the bearing so that they form a given angle between the transducers; control means for controlling the first and second transducers; detection means for detecting electrical signals from the two first and two second transducers; means for combining the electrical signals from the detection means for determining the absolute movements of the shaft; and wherein said system comprises display means; means for simultaneously producing on the said display means two groups of animated or moving circles, the movements of the circles of the first group representing the displacements of the shafts in the bearings and the movements of the circles of the second group representing the displacements of the bearings; and means for positioning the two groups of moving circles on the display means so as to represent the image of the machine.

2. An analysis system according to claim 1, wherein one of the first transducers is aligned with one of the second transducers and the other first transducer is aligned with the other second transducer.

3. An analysis system according to claim 1, wherein the two first transducers are displacement transducers.

4. An analysis system according to claim 3, wherein the displacement transducers are eddy current transducers.

5. An analysis system according to claim 1, wherein the two second transducers are accelerometers and it also comprises means for the double integration of the electrical signals from said second transducers, said integration means then being placed in front of the combination means for the signals.

6. An analysis system according to claim 1, wherein the two second transducers are velocity microphones and it also comprises means for the single integration of the electrical signals from said second transducers, these integration means then being placed in front of the signal combination means.

7. An analysis system according to claims 5 or 6, wherein it also comprises means for amplifying the electrical signals from the single integration means or double integration means.

8. An analysis system according to claim 1, wherein the two second transducers are displacement transducers.

9. An analysis system according to claim 8, wherein the two second displacement transducers are eddy current transducers.

10. An analysis system according to claim 1, wherein the system also comprises means for eliminating the polarization of the electrical signals from the first and/or second transducers.

11. An analysis system according to claim 1, wherein the system also comprises means for the amplification of the electrical signals from the first and second transducers.

12. An analysis system according to claim 1, wherein the system also comprises means for eliminating the unwanted electrical signals or run-out from the first transducers and which are not a function of the displacements of the shaft.

13. An analysis system according to claim 1, wherein the system also comprises means for calibrating the amplitude of the electrical signals from the two first and two second transducers.

14. An analysis system according to claim 1, wherein the angle formed between the two first transducers and between the two second transducers is 90°.

15. An analysis system according to claim 1, wherein the display means comprise a display unit with two units X and Y, provided with a screen and a Wehnelt control, as well as a multiplexing system with four inputs per bearing and two outputs corresponding to inputs X and Y of the display unit.

16. An analysis system according to claim 14, wherein the means for slowing down the animation of the circles are constituted by a regulatable frequency stroboscope connected to the Wehnelt control of the display unit.

17. An analysis system according to claim 16, wherein it also comprises means for displaying the circle animation frequency connected to the stroboscope.

18. An analysis system according to claim 1, wherein the display means also comprise means for slowing down the animation of the circles.

19. An analysis system according to claim 1, wherein the means for producing the animated circles are constituted by a generator generating two groups of sinusoidal electrical signals phase-displaced by an angle of $\pi/2$ and means for synthesizing the electrical signals as a function of the displacements of the shafts and the bearings and the sinusoidal electrical signals.

20. An analysis system according to claim 1, wherein the system also comprises means for selecting either absolute movements of the shafts and bearings, or relative movements of the shafts with respect to the bearings.

21. An analysis system according to claim 1, wherein the system also comprises means for measuring the displacement values of the shaft and bearings and the phase displacements of the different movements observed.

22. An analysis system according to claim 1, including means for analyzing the vibratory movements of several rotary machines each having at least one shaft supported by at least one bearing, wherein the system comprises means permitting the storage of the respective positions of the animated circles corresponding to each of the said machines.

* * * * *